United States Patent
Hecht

(10) Patent No.: US 10,156,738 B1
(45) Date of Patent: Dec. 18, 2018

(54) FOLDABLE LENSES AND NOVEL TRIFOCAL EYEGLASSES

(71) Applicant: Visual Persuasion Ltd., New York, NY (US)

(72) Inventor: Aryeh Hecht, New York, NY (US)

(73) Assignee: VISUAL PERSUASION LTD., New York, NY (US)

( * ) Notice: Subject to any disclaimer, the term of this patent is extended or adjusted under 35 U.S.C. 154(b) by 0 days.

(21) Appl. No.: 15/701,032

(22) Filed: Sep. 11, 2017

Related U.S. Application Data

(60) Provisional application No. 62/393,483, filed on Sep. 12, 2016.

(51) Int. Cl.
| | |
|---|---|
| *G02C 7/08* | (2006.01) |
| *G02C 7/06* | (2006.01) |
| *G02C 5/22* | (2006.01) |
| *G02C 9/02* | (2006.01) |
| *G02C 9/04* | (2006.01) |
| *G02C 5/00* | (2006.01) |

(52) U.S. Cl.
CPC .............. *G02C 7/06* (2013.01); *G02C 5/2227* (2013.01); *G02C 7/068* (2013.01); *G02C 7/086* (2013.01); *G02C 7/088* (2013.01); *G02C 9/02* (2013.01); *G02C 9/04* (2013.01); *G02C 5/008* (2013.01)

(58) Field of Classification Search
CPC ..................................................... G02C 7/088
USPC ..................................................... 351/159.48
See application file for complete search history.

(56) References Cited

U.S. PATENT DOCUMENTS

| | | | |
|---|---|---|---|
| 3,305,294 A | 2/1967 | Alvarez | |
| 3,498,701 A * | 3/1970 | Miller | G02C 7/06 351/159.48 |
| 5,118,178 A * | 6/1992 | Tuckman | G02C 7/00 351/57 |
| 5,598,232 A * | 1/1997 | Pronesti | G02C 7/06 351/54 |
| 6,027,214 A * | 2/2000 | Graham | G02C 7/086 351/41 |
| 2007/0171360 A1* | 7/2007 | Parikumar | G02C 5/00 351/159.19 |
| 2008/0151184 A1* | 6/2008 | Spivey | G02C 7/02 351/178 |
| 2010/0165288 A1* | 7/2010 | Shim | G02B 3/10 351/159.48 |

OTHER PUBLICATIONS

McAllister Franklin Bifocals, Gilbert Cohen Collection, http://gilbertcohencollection.com/selected-items/mcallister-franklin-bifocals-tinted-side-lenses-solid-gold; Nov. 30, 2013.

(Continued)

*Primary Examiner* — Darryl J Collins
(74) *Attorney, Agent, or Firm* — Gottlieb, Rackman & Reisman, PC

(57) ABSTRACT

Eyeglasses are disclosed having a frame retaining a lower bifocal lens portion in a fixed position and an upper lens portion connected by a hinge or a transparent film layer and may include a spring arranged to snap the upper portion into an erect position or a lowered position. The eyeglass lenses can be operated independently for the two eyes of the wearer. Thus one eye can have the bifocal view for distance and reading, while the other eye has the view for magnification.

17 Claims, 2 Drawing Sheets

(56) References Cited

OTHER PUBLICATIONS

Antique Spectacles, http://www.antiquespectacles.com/; downloaded Aug. 8, 2016.
Rakuten Global Market, double-lens sunglasses; http://global.rakuten.com/en/store/diva-closet/item/qpintrade-32348857940/, downloaded Aug. 8, 2016.
Multi Focus Advanced Reading Glasses, Foster Grant; http://www.multifocusreader.com/, downloaded Aug. 8, 2016.
Adlens Adjustables, Aldens Ltd., http://www.protecfarma.com/media/adlens/Adjustables-Brochure-US-WEB.pdf, 2014.
Alvarez Dual Lens, Aldens Ltd., https://adlens.com/technology/alvarez-lens/, downloaded Aug. 8, 2016.

\* cited by examiner

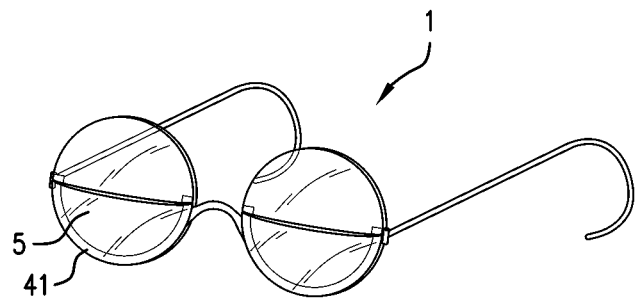
FIG.1
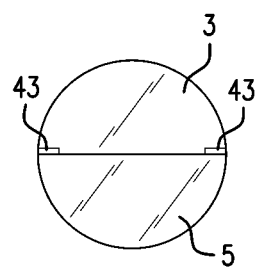  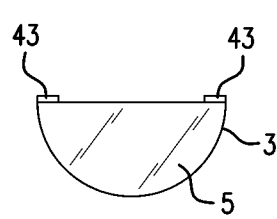
FIG.2A     FIG.2B
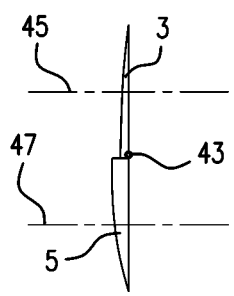  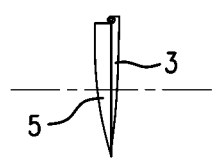  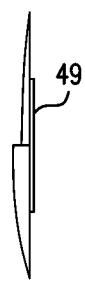
FIG.3A     FIG.3B     FIG.3C

FOLDABLE LENSES AND NOVEL TRIFOCAL EYEGLASSES

This patent application claims benefit under 35 U.S.C. § 119 to U.S. Provisional Patent Application No. 62/393,483, filed on Sep. 12, 2016, which is hereby incorporated by reference in its entirety as part of the present disclosure.

FIELD OF THE INVENTION

The invention relates to adjustable eyeglasses capable of quickly transitioning from bifocal to magnification usage and folding lenses for general use.

BACKGROUND OF THE INVENTION

Various mechanisms are known for modifying eyeglasses from one use to another. For example, various clip-ons having optical density are provided as protection against sunlight glare. Also, a second lens may ride on a mechanical lens support to be brought in front of an existing lens to provide magnification. In addition arrangements are known to continuously vary the optical properties of lenses by sliding one part over another or to employ liquid based focus adjustment. What is not known however is a quick way to take a bifocal and use the upper portion to increase the magnification of the lower portion.

BRIEF DESCRIPTION OF THE INVENTION

Eyeglasses are disclosed having a frame retaining a lower lens portion in a fixed position and an upper lens portion connected by a hinge, living hinge or a transparent film layer and may include a spring arranged to snap the upper portion into an erect position or a lowered position. The upper lens portion may be made of a flexible material arranged so that the upper lens portion snaps into its erect and lowered positions. The glasses may also have the lower lens connected by the nose bridge at the center, and the temples at the sides.

The upper lens portion and the lower lens portion are normally in essentially the same plane. The two lens portions each have an optical axis, which align when the upper lens position is snapped onto the lower position either by flipping the upper portion in front of or behind the lower portion The folding lens may be used without incorporation into eyeglasses, for example in cameras, telescopes, microscopes, etc. The glasses can be operated independently for the two eyes of the wearer. Thus one eye can have the bifocal view for distance and reading, while the other eye has the view for magnification.

BRIEF DESCRIPTION OF THE DRAWINGS

FIG. 1 is a drawing of the eyeglasses in one embodiment.

FIG. 2A shows a front view of one of the lenses in use as a bifocal lens.

FIG. 2B shows a front view of one of the lenses folded for use as a magnifier.

FIG. 3A shows a side view of the lens of FIG. 2A

FIG. 3B shows a side view of the lens of FIG. 2B.

FIG. 3C shows a side view of a lens with a film hinge.

DETAILED DESCRIPTION OF PREFERRED EMBODIMENTS OF THE INVENTION

The present invention provides a unique lens that may be incorporated into eyeglasses 1 that provide three different diopter views. In a first position the glasses are similar to standard bifocal eyeglasses. That is they have an upper part 3 for distance viewing and a lower part 5 for reading. In addition however the present invention provides for a magnification option in which the upper part is brought into position in front of or behind the lower part as in FIGS. 2B and 3B for magnification.

Figure 4A:
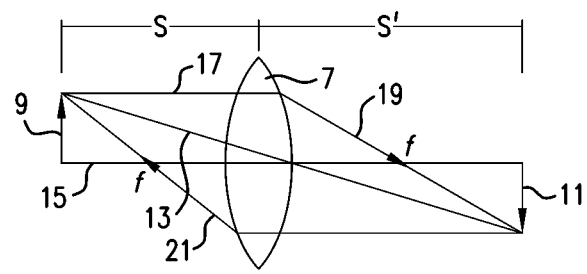
FIG. 4A shows schematically the passage of light from an object through a thin lens.
Figure 4B:
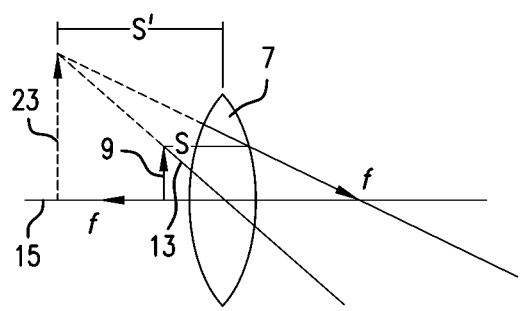
FIG. 4B shows the formation of virtual image by a thin lens.

The effect of providing one thin lens substantially in tandem contact with another is to combine their diopter power by simply adding their values. That may be seen as follows:

FIG. 4 depicts a thin lens 7 (curvature and thus thickness exaggerated) having focal points at a distance f on either side of the lens. The distance f is the focal length of the lens. An object 9 emits rays of light that pass through the lens and are focused to form an image 11. Three light rays allow explaining what occurs. A light ray 13 though the center of the lens is essentially unimpeded as shown in FIG. 4A. A light ray 17 parallel to the optical axis 15 of the lens passes through the focal point on the other side 19. Similarly a light ray 21 passing through the focal point on the near side emerges parallel to the optical axis 15. In the simplest case, the distance s of the object is greater than the focal length f and the image 11 is a real image formed at a distance s' beyond the focal length on the far side of the lens. If s is less than f, as shown in FIG. 4B a real image is not formed, but instead the light emerging from the lens is diverging as if originating from a point 23 to the left of the lens. It is termed a virtual image and s' becomes a negative value.

The relationship between s, s' and f is known as Gauss' thin lens formula and is a consequence of Snell's law of refraction at the essentially spherical surfaces of the thin lens.

$$1/s + 1/s' = 1/f. \tag{1}$$

Figure 5:
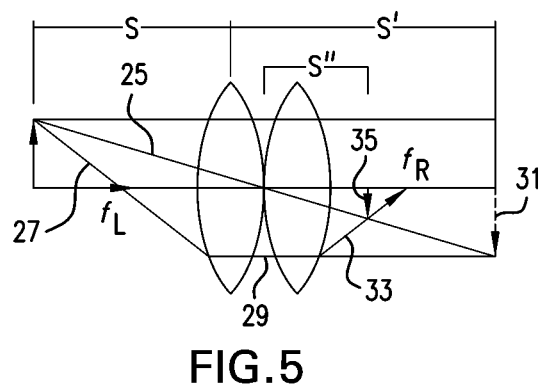
FIG. 5 shows image formation by a pair of thin lenses in contact.

Because of the presence of reciprocals, it is more convenient to use the diopter, which is just the reciprocal of the focal length measured in meters. Thus a lens with a focal length of ½ meter is a 2 diopter lens. If the lens is biconcave instead of biconvex the focal points are interchanged and the diopter value is negative.

Where there are two thin lenses in close contact, the situation resembles FIG. 5. Again one ray 25 passing near the center of the lenses is substantially not deflected. A ray 27 through the focal point $f_L$ of the leftmost lens emerges 29 parallel to the optical axis. As shown in FIG. 5, $$1/s + 1/s' = 1/f_L. \tag{2}$$

However, the image from the leftmost lens acts as a virtual image 31 for the rightmost lens. As shown in FIG. 5, the parallel ray 29 is deflected by the rightmost lens to emerge 33 through the focal point $f_R$ of the rightmost lens. Thus the real image 35 forms at a distance s" to the right of the lens. Since the image 31 is virtual, its distance is −s'. Hence $$-1/s' + 1/s'' = 1/f_R. \tag{3}$$

Adding equations (2) and (3) yields $$1/s + 1/s'' = 1/f_L + 1/f_R. \tag{4}$$

Thus the two lens system has a focal length $1/f_L + 1/f_R = 1/f_{LR}$, where $f_{LR}$ is the focal length of the combination. Since the reciprocals simply add, so too do the diopter values of the lenses. The diopter value of two thin lenses in contact is the sum of the diopter values of the lenses.

As shown in FIG. 1, the invention comprises eyeglasses 1 having a frame 41 capable of retaining a lower lens portion 5 in a fixed position. The glasses may also have the lower lens connected by the nose bridge at the center, and the temples at the sides. The upper lens portion 3 is connected by a retaining mechanism 43, such as a hinge or a transparent film layer as in FIG. 3C, to the lower lens portion. An alternative is to attach the upper lens portion by use of a retaining mechanism that is attached to the upper lens portion and the frame 41 without being attached to the lower lens portion. The retaining mechanism may be a mechanical hinge having a hinge pin, or may be a flexible connector, and may include a spring arranged to snap the upper portion into an erect position as in FIG. 3A or a lowered position as in FIG. 3B. The hinge may be a living hinge, namely a thin, flexible web that connects two relatively rigid adjacent wall sections. It may be injection molded, extruded or produced via machining or stamping. The most durable of the three types is a hinge produced by injection molding. Since it is very thin it enables the two bodies to move rotationally to angles of 180 degrees or more. Such a hinge is very durable and can last for millions of cycles. The living hinge enables a part to be connected to a main body while allowing it to move out of its first position into a second. It is also contemplated to make at least the upper lens portion of a flexible material arranged so that the upper lens portion snaps into its erect and lowered positions. Such a lens system may be made by employing a plastic that when injected will result in a relatively rigid half of the lens by injection into a wider cavity, and a flexible half of the lens formed in a thinner cavity, the two lens portions being connected by a living hinge.

The two positions of the upper lens portion are a first position where the upper lens portion and the lower lens portion are in the essentially the same plane as shown in FIG. 3A. The two lens portions each have an optical axis, depicted in FIG. 3A, which align when the upper lens position is snapped onto the lower position as in FIG. 3B, which is referred to as a second position. The second position can be achieved either by flipping the upper portion in front of or behind the lower portion. In front of is preferred so that the second position can be achieved without removing the eyeglasses from the user's head.

The diopter values for the lenses are for example in a general diopter range of +1.0 to +1.5 for the upper lens portion for distance viewing, and +2 to +3 diopter for the lower lens portion for reading. Thus, in the second position the glasses have a diopter value between +3 and +4.5, which is suitable for magnification.

The glasses can be operated independently for the two eyes of the wearer. Thus one eye can have the bifocal view for distance and reading, while the other eye has the view for magnification.

Although embodiments of the invention have been described, other variants that would be apparent to persons of skill are intended to be covered. The scope of the invention is described in detail in the claims that follow.

What is claimed is:

1. Eyeglasses comprising
   a bifocal lens comprising a lower lens portion and an upper lens portion movable with respect to said lower lens portion,
   an eyeglass frame for fixedly retaining said lower lens portion,
   an upper lens portion retaining mechanism for holding said upper lens portion in a first position above said lower lens portion, said retaining mechanism permitting motion of said upper lens portion to a second position in front of or behind said lower lens portion,
   wherein each lens portion has a respective optical axis, and in said second position the optical axes of the two lens portions coincide,
   wherein said eyeglasses provides two different diopter views for a wearer of said eyeglass frame in its first position, and a third different diopter view for a wearer of said eyeglass frame in its second position
   wherein the upper lens portion is flexible and capable of being snapped into said first and second positions.

2. The eyeglasses of claim 1, wherein in said first position said upper lens portion and said lower lens portion are in the same plane.

3. The-eyeglasses of claim 1, wherein said retaining mechanism comprises a hinge.

4. The eyeglasses of claim 1 wherein the upper portion has a power for distance viewing and the lower lens has a power for magnification.

5. The eyeglasses of claim 1 wherein the upper portion has a power from +1.0 to +1.5 diopters and the lower portion has a power from +2 to +3 diopters.

6. The-eyeglasses of claim 1 wherein at least the upper lens portion is made from a polymer.

7. The-eyeglasses of claim 1 wherein the lens portions are repeated for each eye of the wearer, and wherein the portions before each eye are capable of separate motion from a first position to a second position.

8. The-eyeglasses of claim 1 wherein said retaining mechanism is made from the same material as said upper portion.

9. Eyeglasses comprising:
   a bifocal lens comprising a lower lens portion having an upper edge and an upper lens portion having a lower edge, said upper lens portion being movable with respect to said lower lens portion,
   an eyeglass frame for fixedly retaining said lower lens portion,
   an upper lens portion retaining mechanism extending along an upper edge of said lower lens portion separate from said eyeglass frame and attached to both the lower edge of said upper lens portion and the upper edge of said lower lens portion for holding said upper lens portion in a first position above said lower lens portion, said retaining mechanism permitting motion of said upper lens portion to a second position in front of or behind said lower lens portion,
   wherein during motion the upper edge of the lower lens portion remains adjacent to the lower edge of the upper lens portion,
   wherein said lens provides two different diopter views for a user of said lens in its first position, and a third different diopter view for a user of said lens in its second position
   wherein the upper lens portion is flexible and capable of being snapped into said first and second positions.

10. The eyeglasses of claim 9, wherein in said first position said upper lens portion and said lower lens portion are in the same plane.

11. The eyeglasses of claim 9, wherein each lens portion has a respective optical axis, and in said second position the optical axes of the two lens portions coincide.

12. The eyeglasses of claim 9, wherein said retaining mechanism comprises a hinge.

13. The eyeglasses of claim 9 wherein the upper portion has a power for distance viewing and the lower lens has a power for magnification.

14. The eyeglasses of claim 9 wherein the upper portion has a power from +1.0 to +1.5 diopters and the lower portion has a power from +2 to +3 diopters.

15. The eyeglasses of claim 9 wherein at least the upper lens portion is made from a polymer.

16. The eyeglasses of claim 9 wherein the lens portions are repeated for each eye of the wearer, and wherein the portions before each eye are capable of separate motion from a first position to a second position.

17. The eyeglasses of claim 9 wherein said retaining mechanism is made from the same material as said upper portion.

* * * * *